United States Patent [19]

Schoen et al.

[11] 4,039,732

[45] Aug. 2, 1977

[54] AFTERCHLORINATED VINYL CHLORIDE POLYMERS

[75] Inventors: Löwhardt A. A. Schoen, Geleen; Wilhelmus G. M. Bruls, Geulle; Wilhelmus A. M. Debets, Schinnen, all of Netherlands

[73] Assignee: Stamicarbon B. V., Geleen, Netherlands

[21] Appl. No.: 677,784

[22] Filed: Apr. 16, 1976

[30] Foreign Application Priority Data

Apr. 18, 1975 Netherlands .......................... 7504616

[51] Int. Cl.² .............................................. C08F 8/22
[52] U.S. Cl. ......................................... 526/43; 526/17
[58] Field of Search .................................. 526/43, 17

[56] References Cited

U.S. PATENT DOCUMENTS

| 3,163,631 | 12/1964 | Schwander et al. | 526/43 |
| 3,475,401 | 12/1969 | Ben-Moshe et al. | 526/43 |
| 3,663,392 | 5/1972 | Zeitler et al. | 526/43 |
| 3,813,370 | 5/1974 | Gambaretto et al. | 526/43 |

FOREIGN PATENT DOCUMENTS

| 801,304 | 1/1951 | Germany | 526/43 |
| 7,246,200 | 2/1968 | Japan | |

Primary Examiner—William F. Hamrock
Attorney, Agent, or Firm—Cushman, Darby & Cushman

[57] ABSTRACT

Vinyl chloride polymers are chlorinated in a dry, two-step process including treating particulate vinyl chloride with gaseous chlorine at temperatures in the range of $-20°$ C to $+50°$ C, preferably $20°-25°$ C and without the use of radical-forming initiators or radiation for at least about 30 minutes, then increasing the temperature of the reaction to at least 70° C until thermal radical formation occurs. In the second step the temperature is maintained below the point where the vinyl chloride is apt to agglomerate or discoloration occurs.

18 Claims, 1 Drawing Figure

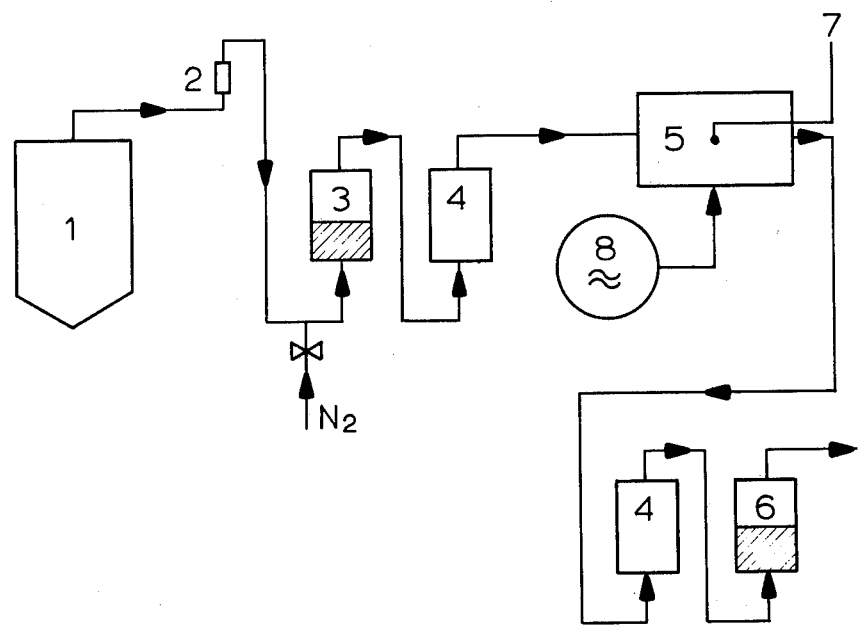

AFTERCHLORINATED VINYL CHLORIDE POLYMERS

BACKGROUND OF THE INVENTION

This invention relates to a process for dry chlorination of powdery vinyl chloride polymers, and more particularly vinyl chloride homopolymers, with gaseous chlorine.

As used herein, the term "vinyl chloride polymers" is understood to mean homopolymers of vinyl chloride and copolymers of vinyl chloride with at most 20 mol percent of one or more other monomers. Aside from their many excellent properties, vinyl chloride polymers have the considerable drawback in that they become unusable at only slightly elevated temperatures of approximately 60° to 70°C and lose their dimensional stability. Because of this disadvantage, vinyl chloride polymers are not used as such in major applications like tubes or vessels for hot liquids.

It is known that vinyl chloride polymers can be provided a greater heat resistance by chlorination. The Vicat temperature, that is the softening temperature of the polymer under a load of 5 $kg/cm^2$, as accurately described in the standard ISO-R 306, corresponding to ASTM-D 1525, is generally used as a measure of the dimensional stability at elevated temperatures.

Chlorinated vinyl chloride polymers not only have a higher Vicat temperature, but also possess better fireresistant properties and have a higher resistance against chemicals than the original (unchlorinated) vinyl chloride polymers, while at the same time the linear expansion coefficient remains low. On the other hand, afterchlorinated vinyl chloride polymers are more difficult to process and more brittle. However, these disadvantages can be completely or substantially eliminated by mixing with non-afterchlorinated vinyl chloride polymers and/or flow and impact strength improving agents.

In practice, a number of processes have become known for chlorination of vinyl chloride polymers, particularly vinyl chloride homopolymers. For instance, polyvinyl chloride can be chlorinated in solution. Owing to the poor solubility of vinyl chloride polymers, such chlorinations are conducted at temperatures above 100° C, as a rule at 120°–130° C, in inert solvents like chlorobenzene or perchlorethylene. Such processes are expensive and do not yield a powdery product, and for that reason are only used if the price of the ultimate product is less critical, as in compounding afterchlorinated vinyl chloride polymers for use in lacquers, glues, lining preparations, and the like.

Powdery (particulate) vinyl chloride polymers, preferably the homopolymers are used in the building industry for hot water pipes, sewer pipes, tubes for central heating, colored window sections, for plate sections and in the chemical processing industry for vessels and lines for storage and transport of hot or corrosive liquids, reactors for the electro-chemical industry and the like. If chlorinated vinyl chloride polymers are used as the fabricating resin, these, too, are desirable in powder form which is well suited for stabilization and further processing according to current compounding techniques, and to achieve this end, chlorination processes are used in which the chlorinated vinyl chloride polymer products are obtained in powder form. This is in contrast to the solution chlorination process described above.

Powdery chlorinated vinyl chloride polymers prepared by aqueous suspension processes are described in several publications or patents such as British Pat. specifications Nos. 1,081,057, 948,372, 976,001, 1,120,769 and 1,186,847, German Pat. Application No. 1,811,472, U.S. Pat. Nos. 3,632,848 and 3,345,140 and French Pat. Nos. 1,286,811, 1,309,937 and 1,580,070. According to the general procedures there described, powdery polyvinyl chloride is suspended in water, then, in the presence of a radical initiator, chlorine is passed through the PVC suspension at elevated temperatures until a vinyl chloride polymer is obtained the required pre-determined chlorine content.

A drawback of the aqueous suspension process is that chlorine dissolves only poorly in water at elevated temperatures and even at increased pressures the chlorination still proceeds slowly. For instance, at a pressure of 4 $kg/cm^2$ and at temperatures rising form 35° to 85° C, with lauroyl peroxide of di-isopropyl peroxide dicarbonate as radical initiator, a reaction time of 12.5 hours is needed to increase the chlorine content, from 56.8% by weight for normal polyvinyl choride to 67.9% by weight for the more chlorinated product.

Another process of forming chlorinated vinyl chloride polymers is the gel-phase process. The drawback of the long reaction times required for the aqueous-suspension processes are not present in the gel phase processes. The gel phase process is based on the fact that vinyl chloride polymers and chlorinated vinyl chloride polymers are insoluble below 80° C in carbon tetrachloride and chloroform, but swell in such solvents to become gel-shaped products.

In illustrative gel phase processes the powdery vinyl chloride polymer is suspended in one of the solvents mentioned, whereupon, with stirring and in the presence of a radical initiator such as a peroxide compound or a radical-initiating radiation, at 50°–60° C chlorine is passed through the suspension. Processes based on this procedure are described in U.S. Pat. No. 3,627,853, British Pat. Specification No. 1,325,579 German Pat. No. 1,208,889, and Italian Pat. No. 852,492. The vinyl chloride polymer particles swell substantially in the carbon tetrachloride on the chloroform solvents and diffusion of chlorine- and initiator-molecules into such highly swollen particles proceeds well. Chlorine is very soluble in the diluent and, hence, relatively high chlorination speeds can be reached requiring only 2 to 2½ hours for preparation of a chlorinated polyvinyl chloride polymer having a chlorine content of up to about 68% by weight.

As a result of the substantial swelling only rather dilute suspensions of at most about 20% by weight of vinyl chloride polymer can be used as a starting suspension, since the suspensions would otherwise no longer be stirrable. A disadvantage of these processes is that the swelling increases as the chlorine content increases and that above a chlorine content of about 68% by weight, rapid disintegration of the particles occurs, at which point stirring is for a practical matter no longer possible. In that case a powdery product cannot be recovered from the viscous gel mass when this is processed, unless costly grinding treatments are applied.

In the early sixties an aqueous gel phase process was invented which is described in U.S. Pat. No. 2,996,489, and using this process a commercial scale chlorination procedure is available. In the aqueous gel phase process chlorination takes place in a stirred three-phase system, which phases are polymer particles, carbon tetrachloride or chloroform and water. By using water as a phase in the system, less carbon tetrachloride or chloroform will suffice, the system is stirred easier, while reasonably high chlorination speeds can still be attained. In connection with the disintegration of the polymer particles, in this process chlorination can also be completed to a chlorine content of at most about 68% by weight.

Finally, processes have also been described in which vinyl chloride polymers, in a fluidized state or stirred mechanically in one way or other, are chlorinated with gaseous chlorine; see British Pat. Specifications Nos. 1,089,323, 1,242,158, and 1,318,078, U.S. Pat. Nos. 3,532,612, 3,663,392 and 3,813,370, and German Pat. Nos. 1,110,873 and 1,259,573.

According to these procedures the chlorination is conducted at temperatures of between 40° and 140° C in the presence of radical-initiating radiation or of an initiator which forms gaseous or solid radicals. Generally, these processes are not conducted isothermally. A moderately elevated temperature is the starting point, the temperature being raised gradually during the course of the chlorination usually to values at this radical formation by thermal initiation also starts to play a part in the chlorination procedure. The direct use of temperatures at which thermal initiation plays a part causes disintegration of the vinyl chloride polymer which has not yet been converted. However, a reproducible manner of practicing an exothermic gas phase process, in which the temperature is to be varied under controlled conditions, is extremely difficult to conduct. A process of this kind, further, cannot be carried out continuously; for a continuous process one should either chlorinate at one definite temperature, or conduct the chlorination in two or more steps.

It has been observed that a vinyl chloride polymer chlorinated according to a gas phase process, or an aqueous-suspension process, has an appreciably lower Vicat temperature than a vinyl chloride polymer with the same chlorine content but having been afterchlorinated according to a gel phase process. According to the U.S. Pat. No. 2,996,489 the ratio between 1,2-dichloroethane units and 1,1-dichloroethane units, which are formed in the afterchlorination, have a considerable influence on this, however subsequent investigations by Trautvetter (Kunststoffe Plastics 2 (1966) 54–58) have proven this view to be incorrect. It is now assumed that in the gas phase processes an inhomogeneous chlorination of the vinyl chloride polymer particles is the cause for the relatively low Vicat temperature.

In the gas phase chlorination the vinyl chloride polymer particles are not swollen and, hence, except at the surface, are difficult for the access to both chlorine molecules and initiator molecules. If radical-initiating radiation is used rather than an initiator it does not penetrate, or if it does, penetrates in a greatly weakened state into the interior part of the particles. Solid, powdery initiators cannot diffuse into the polymer particles. Chlorine radicals formed in the gas phase can penetrate into the particles only after the external layers are completely chlorinated. Only gaseous initiators could diffuse in the polymer particles and thus eliminate the objections regarding the inhomogeneous chlorination. The use of fluorine as a gaseous initiator is described in U.S. Pat. No. 3,813,370.

Efforts to use thermal radical initiation have not been successful. Thermal initiation only becomes significant as contributing to the processing at temperatures of at least 75° C and reasonable chlorination speeds are only obtained at a temperature of at least 100° C. At temperatures above about 80° C, however, thermal degradation of vinyl chloride polymers occurs. For this reason gas phase processes are as a rule carried out in their entirety below 80° C and in the presence of an initiator, or in a 2-step process partly below 80° C with a radical-forming initiator or radiation, and then partly at higher temperatures. Chlorinated polyvinyl chloride has a better thermal stability than the polyvinyl chloride itself and it appears that after a certain period of chlorination, the temperature may be increased without any risk of the vinyl chloride polymer being disintegrated. A difficulty involved in this process is that one cannot establish accurately when the temperature of the reaction may safely be raised without disintegration occurring. Of course, the major objection remains that the Vicat temperatures are considerably lower than is the case in the chlorination according to the gel phase processes.

DESCRIPTION OF THE INVENTION

Surprisingly, we have now found that the objections of the gas phase processes described above can be eliminated — which is a distinguishing characteristic of the present invention — by keeping the powdery vinyl chloride polymer (particularly vinyl chloride homopolymer), in the absence of radical-forming initiators and/or radical-forming initiating radiation, in a chlorine atmosphere in a first step at temperatures being at most slightly above ambient temperatures. In said first step the temperature is preferably not over 50° C. The treatment with chlorine in said first step may be carried out at or below ambient temperatures, being preferably not below −20° C. Subsequently, in a second step, increasing the temperature to temperatures of the order of at least 70° C, but below the agglomeration temperature of the polymer, in such a way that thermal radical-formation occurs, and by applying chlorine to the polymer and chlorinating until the required chlorine content is reached, the time during which the polymer is kept in a chlorine atmosphere at, at most, 50° C, the time being selected such that in the subsequent chlorination at temperatures at this thermal radical-formation occurs, no thermal degradation attended by discoloration takes place. According to the process of the present invention chlorinated vinyl chloride polymers are produced having Vicat temperatures which are comparable with those of vinyl chloride polymers having a corresponding chlorine content and being chlorinated according to gel phase processes. The present chlorinated vinyl chloride polymers are favorably distinguished as regards product properties from vinyl chloride polymers which have been chlorinated according to known gas phase processes and exhibit substantial and attractive economic improvements over vinyl chloride polymers chlorinated according to gel phase processes.

We assume that, although not being absolutely certain, a type of stabilization of the vinyl chloride polymer by saturation of the residual unsaturation of that polymer plays an important role in the process, so that chlorination can be effected at temperatures at which thermal radical initiation occurs, without thermal degradation of the vinyl chloride polymers as discussed above occurring. Thermal degradations of this kind are also accompanied by discoloration of the polymer. According to the present process pure white powders are conveniently and economically obtained.

We have found that molecular chlorine adds, even at rather low temperatures, to a double bond according to an ionic mechanism. A slight degree of unsaturation is invariably present in vinyl chloride polymers. In the presence of chlorine radicals, primarily substitution in the allylic position, referred to the unsaturated bond, takes place, while little or no addition to the unsaturated bond takes place. Therefore, in order to promote the ionic addition-reaction, formation of chlorine radicals during the so-called stabilization period should be suppressed, or at least not be promoted. For this reason no radical-forming initiator should be present, or no irradiation by radical-initiating radiation should take place, while the temperatures is also selected such that little, or at least as little as possible, thermal radical formation takes place.

Since the addition of chlorine to a double bond proceeds very rapidly, even at temperatures below 0° C, the stabilization here referred to can be effected at any temperature, at which no or hardly any radical formation will occur, that is, temperature of at most about 50° C and preferably at most about 35° C. At atmospheric pressure chlorine becomes liquid at −34° C and becomes liquid at a pressure of 8 atmospheres absolute at about 26° C. The stabilization temperatures lying above the condensation point of chlorine should be chosen, generally amounting to at least −20° C at atmospheric pressure. Although addition also proceeds rapidly at low temperatures, development of the stabilization, used herein, is determined by diffusion speeds. In order not to retard these unnecessarily, without this being compensated by demonstrable advantages, a temperature is preferably not used below 0° C and, more particularly, the treatment with chlorine will in the first step be initiated at temperatures of from 20° to − 25° C, that is, the ambient temperature in closed spaces. In case of open air reaction vessels the temperatures can diverge strongly and it may then be of advantage, for reproducibility to be achieved, to use heating or cooling to some degree, so that stabilization takes place at temperatures of 20°-25° C. We have observed that the stabilization is attended by a slight exothermic effect. Generally, the temperature rise amounts to at most 10° C and also for this reason an initial temperature of 20°-25° C is preferred.

Vinyl chloride polymers to be chlorinated and obtained according to known technical processes such as suspension polymerization, emulsion polymerization or mass polymerization all possess a certain porosity. Both in the stabilization here referred to and in the chlorination itself, the chlorine is diffused through the pores to the interior of the polymer particles.

The time required for stabilization reaction thus necessarily depends on the porosity and the particle size and can be easily determined by any person having ordinary skill in the art by keeping the vinyl chloride polymer first in a chlorine atmosphere for different periods of time at the ambient temperature or a slightly elevated temperature, and by subsequently chlorinating it at a temperature of preferably above 100° C, and more preferably at a temperature of 110° to 130° C. One will observe that if the stabilization period has been too short, discoloured products are obtained during the chlorination at temperatures above 100° C.

The stabilization period, therefore, should be chosen to be sufficiently long, so that after chlorination at high temperatures, fine white powders are obtained which are not discolored. Stabilization lasts generally at least about 30 minutes and we have found that preferably a stabilization period of at least 45 minutes will be used. While a longer stabilization period will have no deleterious effect to the polymer in any respect for economic considerations, the time of stabilization is selected to be no longer than necessary.

The stabilization as described herein must take place below temperatures at which thermal degradation of vinyl chloride polymers take place, and at a temperature at which the formation of chlorine radicals is so small as to be negligible, that is, at temperatures of at most about 50° C, and preferably at temperatures of at most about 35° C. Radical-initiating radiation, that is, radiation at a wavelength of less than 4800 A. or free radical initiators are not required, and thus should be absent. During the stabilization period the vinyl chloride polymer particles are saturated with chlorine molecules.

Next the vinyl chloride polymer is heated in the chlorine atmosphere to the reaction temperature. The heat-up time is not of particular consequence to the overall process, but is preferably kept as short as possible for practical reasons.

The chlorination reaction is then conducted at an essentially constant temperature. The chlorination temperature is chosen sufficiently high to allow the chlorination of the vinyl chloride polymer via a thermal radical-initiation to develop at a reasonable speed. Preferably, therefore, the chlorination temperature is not below 100° C. On the other hand, the temperature should not be selected so high that agglomeration of the vinyl chloride polymer occurs, and for this reason a temperature of at most about 140° C is chosen, and preferably of at most about 130° C.

Chlorination may be effected at any convenient pressure, that is at atmospheric pressure, at a slightly decreased pressure, as well as an elevated pressure. A slightly decreased pressure has the advantage that chlorine does not escape when leakages occur in the chlorination apparatus or the supply and discharge lines. On the other hand, air may then enter the apparatus when leakages occur, and the presence of even small amounts of oxygen is detrimental to a proper development of the chlorination reaction. For these considerations we prefer to conduct the chlorination reaction at pressures of at least 0.8 kg/cm$^2$.

Chlorination at an elevated pressure causes the diffusion in pores and in particles to proceed more rapidly because of the higher chlorine concentration ensuing therefrom, so that the chlorination reaction as a whole will develop more rapidly. For practical reasons the upper pressure limit chosen does not exceed 10 kg/cm$^2$. Equipment withstanding pressures of more than 10 kg/cm$^2$ is much more expensive than equipment in which processing can be effected at pressures of up to 10 kg/cm$^2$; disadvantages of this type are not offset by matching advantages.

Because of the condensation temperature of chlorine the stabilization is carried out at pressures of up to 8 kg/cm$^2$. The chlorination is an exothermic process and should not proceed so rapidly that at one or more points in the reactor individual temperatures occur which are so high that agglomeration and/or dicoloration of the vinyl chloride polymer occurs. Proper heat transfer should be maintained, which can be achieved by chlorinating the vinyl chloride polymer in fluidized state, or by providing for proper admixture and dissipation of heat through the wall and/or through cooling elements installed in the reactor itself. These types of cooling means are generally known in the art, although certain advantages may be gained by one means not present in another. For instance, in the chlorination of fluidized vinyl chloride polymer relatively large quantities of gas are necessary which is a disadvantage, even though this gas can be recycled. Preferably, thorough mechanical admixing is applied, by itself or optionally combined with a gas throughflow but in an amount that is smaller than that required for a fluidization state.

Chlorination is preferably carried out in a pure chlorine atmosphere, but, if necessary, the chlorine may also be diluted with a gas which is inert to the vinyl chloride polymer, which may be advantageous in the chlorination of fluidized vinyl chloride polymer.

The present process is applicable for polymers of vinyl chloride with at most 20% by weight of one or more other monomers. Illustrative monomers which may be copolymerized with vinyl chloride are vinylidene chloride; vinyl esters, like vinyl acetate, vinyl butyrate and vinyl benzoate, acrylic acid and methacrylic acid, alkyl esters, amides or nitriles thereof, for instances ethacrylic acid, ethyl acrylate, methyl methacrylate, butyl methacrylate, acrylamide and acrylonitrile; vinyl aromatic compounds, for instance, styrene, chlorostyrene, methyl styrene, ethyl styrene, vinyl naphthalene, alkyl esters of maleic acid and fumaric acid, for instance diethyl maleate; vinyl alkyl ethers and vinyl alkyl ketones, vinyl pyridines, copolymerizable olefins, such as ethylene, propylene, butylene isobutylene, 4-methyl pentene-1. Also mixtures of polyvinyl chloride and copolymers of vinyl chlorides may be applied. Copolymers as used herein include both substantially statistical copolymers and graft- and block-copolymers.

For the graft polymers mention is here made of the graft polymers of vinyl chloride onto copolymers of ethylene and vinyl acetate or ethylene and alkyl acrylates. The chlorination of graft polymers of vinyl chloride on copolymers of ethylene and vinyl acetate is known and described in British Pat. Specification No. 1,095,831.

The process of the present invention is preferably used for chlorinating homopolymers of vinyl chloride.

The present process is useful for treating polyvinyl chloride having different molecular weights. The polyvinyl chlorides usually used by the art have a K value which generally lies between 45 and 80 and mostly between 50 and 75. The K value, which is a measure of the molecular weight, is defined by Fikentscher (Zellulosechemie 13 (1932) 58).

Chlorination may be continued until the maximum chlorination has been achieved, that is, a chlorine content of 73.2% by weight of chlorine, which corresponds with 2 chlorine atoms per 2 carbon atoms. However, a much less extensive chlorination will suffice quite well, afterchlorination then being applied until contents of 65 to about 70% by weight of chlorine are reached. Of course, chlorination can also be used to achieve lower chlorine contents. For instance, end uses are known of chlorinated polyvinyl chloride having about 60% by weight of chlorine. Chlorinated polyvinyl chlorides of this type can also be prepared according to the present invention to particular advantage.

The chlorinated vinyl chloride polymers obtained according to the present process, prticularly those having high chlorine contents, are by themselves brittle and difficult to process, but by mixing them with processing aids such as ordinary polyvinyl chloride, flow-improving agents, impact-strength-improving agents and the like, one can appreciably improve the brittleness and the processability of the resulting polymers. Though the Vicat temperature generally decreases because of mixing with other products, the ultimate value thereof, in general, even when mixed remains considerably above the Vicat temperature of ordinary polyvinyl chloride. The compositions thus produced are extremely well suited for applications in which a higher Vicat temperature is desired, for instance hot water pipes, lines for central heating, colored sections or panels which may be exposed to sunlight, containers where hot and/or corrosive liquids are stored or processed, and similar end uses.

The chlorinated vinyl chloride polymers possess not only a better mechanical strength at elevated temperatures, but are also more resistant at an elevated temperature to decomposition and, generally, at the same time more resistant to the influence of chemicals.

The properties of the vinyl chloride polymers chlorinated according to the process of the invention correspond to high degree and thus compare favorably with the properties of vinyl chloride polymers chlorinated according to gel phase processes, for instance as described in U.S. Pat. No. 2,996,489, and distinguish themselves in a favorable sense from vinyl chloride polymers chlorinated according to known gas phase processes. In fact, in comparison with the known gel phase processes, the process of the present invention is less costly to operate.

As mentioned above, the chlorinated vinyl chloride polymers are generally more brittle and more difficult to process than the original vinyl chloride polymers, thus the higher the chlorine content, the more brittle and the more difficult to process the product will be. Even if the chlorinated polymer is mixed with non-after-chlorinated vinyl chloride polymer and if one uses known processing aids, it will nevertheless in most cases be desirable for the compositions so obtained to be processed at higher temperatures than the ordinary vinyl chloride polymers. Usually, it will then be desirable to add a stabilizer in order to combat decomposition during the intermixture of the various components.

The vinyl chloride polymer starting material is in the form of a powder. Generally, the average particle size should be more than 10 microns and, preferably, the major portion of the particles is in excess of about 50 microns. Coarser vinyl chloride polymers, having particle sizes up to 0.5 mm, are very suitable. The particle size of the vinyl chloride powder has a bearing on the stabilization reaction conditions, as discussed above.

The starting polymer should be porous at least to some extent. Vinyl chloride polymers prepared according to the generally known suspension-, emulsion- or mass-polymerization processes are all porous to a lesser or greater degree. Porosity and particle size are among the factors determining the time required for the stabilization of the vinyl chloride polymer by keeping it in a chlorine atmosphere at a temperature which is, at most, slightly elevated, and they also influence the chlorination speed at an elevated temperature. Hence, finyl chloride polymers having a porosity from about 0.05 to about 0.5 cm$^3$/g of pore volume are recommended.

We have found that there is no simple relationship between particle size and stabilization time. As a rule, polyvinyl chloride consists of agglomerates of very small, so-called primary particles. The particle size, as determined for instance by sieve-analysis, relates to the agglomerates. During the stabilization period the chlorine may penetrate into the agglomerates and then diffuse in the very small, primary particles. The required stabilization time indeed appears to be little dependent on the size of the agglomerates.

Chlorination according to the present process should be carried out in the absence of oxygen. Technical chlorine contains traces of carbon monoxide, carbon dioxide, nitrogen and oxygen. Chlorine containing up to 60 ppm of oxygen is acceptable, but larger quantities of oxygen have a perceptibly disadvantageous influence on the quality of the chlorinated products obtained and therefore larger amounts of oxygen impurities are not acceptable and should be avoided. Technical chlorine also contains small amounts of iron compounds, which may tend to accelerate the chlorination in the gas phase of vinyl chloride polymers. These iron compounds, if present, may adversely influence the reproducibility of this process, and are preferably removed from the chlorine gas for this reason, for instance by washing the gas with water, but preferably with a acid, like hydrochloric acid or concentrated sulfuric acid. We prefer to use concentrated sulfuric acid in the washing since the resulting chlorine gas remains dry. One can also dilute the chlorine with an inert gas, like nitrogen, and also hydrogen chloride, and use a chlorine atmosphere containing 30–100 vol.-% of chlorine. Dilution may be advantageous in certain situations if the vinyl chloride polymer is kept in the fluidized state, to which end large quantities of gas are required. Generally, however, the use of nondilute chlorine is preferred.

In the chlorinated of vinylchloride polymers hydrogen chloride is released. After the chlorination has been finished, the polymer still contains chlorine and hydrogen chloride, and the chlorine and the hydrogen chloride are expelled from the chlorinated polymer by flushing it at an elevated temperature with a forceful nitrogen flow. If necessary, after the washing with nitrogen, any traces of chlorine and hydrogen chloride still present may be neutralized by first washing the chlorinated polymer with methanol, which reacts with chlorine to form formaldehyde and hydrogen chloride, and by subsequently washing it with a sodium bicarbonate solution or another alkaline solution to collect and remove the hydrogen chloride.

BRIEF DESCRIPTION OF THE DRAWING

FIG. 1 is a schematic illustration of an apparatus for carrying out the process of the present invention.

The present invention is further elucidated by the working, non-limiting examples described below. The tests described in the examples were carried out in an apparatus of the type shown schematically in the Figure, where: 1 is a gas cylinder with chlorine having a temperature of the surrounding air (about 22° C), 2 is a gas-flow meter, 3 is a gas-washing bottle with concentrated sulfuric acid, 4 is a flash-back vessel, 5 is a rotary drum, 6 is a gas-washing bottle with a solution of sodium hydroxide in water, 7 is a thermocouple (chrome alumel) connected to a recording means, and 8 is a thermostatically controlled oil bath heater.

The rotary glass drum 5 has a wall thickness of 2 to 3 mm, a length of about 15 cm, and an internal diameter of about 15 cm. The speed of revolution amounted to about 60 rpm. The drum was filled with 100 to 150 grams of polyvinyl chloride powder. Prior to the chlorination, the equipment was first flushed with nitrogen in order to expel air, and primarily the oxygen it contained. Next, at atmospheric pressure, a continuous flow of chlorine gas at about 22° C amounting to $44.25 \times 10^{-5}$ kg of chlorine per second per kg of polyvinyl chloride was provided. The stabilization period, that is the period during which the polyvinyl chloride was kept in a chlorine atmosphere at a temperature of at most 50° C (during the tests this was the ambient atmosphere) amounted to 1 hour. Although some temperature rise occurred, the temperature remained below 35° C. On one occasion with a filling with 150 grams of polyvinyl chloride the highest temperature rise measured amounted to about 10° C.

After the stabilization period the drum and its contents were heated to the required reaction temperature T by means of the oil bath 8 in which the drum 5 was rotating. In order for the required reaction temperature to be maintained during the reaction period, the temperature of the oil bath had to be kept at about T + 5° C owing to heat loss of the system.

After the required reaction period, the chlorine supply was stopped, whereupon chlorine and hydrogen chloride were blown out of the equipment, and as much as possible out of the chlorinated product, by means of a strong nitrogen stream. The chlorinated product was then taken up in methanol, which reacted with traces of unreacted chlorine still present to form formaldehyde and hydrogen chloride. After off-filtration the chlorinated polyvinyl chloride was washed with a dilute sodium bicarbonate solution in water (50 g of $NaHCO_3$/l), with water, and finally with methanol, whereupon at 40° C, drying was carried out in a vacuum desiccator to constant weight (not shown).

The chlorine analysis of the products so obtained was calculated both by means of elementary analysis and by means of the determination of the increase in weight of the polyvinyl chloride used. The second method mentioned yielded the most accurate results, accurate to 0.10%.

EXAMPLE 1

A series of tests were conducted on Varlan 5900, Varlan 6600 and Varlan 7100. These are commercially available polyvinyl chlorides of the DSM company prepared according to a suspension polymerization process. The particle size distribution of these 3 types of polyvinyl chlorides having K values of 59, 66 and 71, respectively, was established by means of a sieve analysis, on the basis of which the average particle size ($d_{50}$) was calculated. Also the bulk density, the porosity and the BET surface were determined. The characteristics of these materials are represented in Table 1.

Table 1

|  | Varlan 5900 | | Varlan 6600 | | Varlan 7100 | |
| --- | --- | --- | --- | --- | --- | --- |
|  | surface d sieve fraction ($\mu$) | content % | d sieve fraction ($\mu$) | content % | d sieve fraction ($\mu$) | content % |
|  | 63 | 1.5 | 63 | 1.0 | 63 | 2.5 |
|  | 88 | 8.0 | 88 | 7.8 | 88 | 11.3 |
|  | 125 | 37.5 | 125 | 31.6 | 125 | 45.7 |
|  | 177 | 91.2 | 177 | 83.1 | 177 | 94.6 |
|  | 250 | 99.7 | 250 | 99.6 | 250 | 99.9 |
| $d_{50}$ ($\mu$) | 138 | | 145 | | 130 | |
| Bulk density V (g/cm$^3$) | 0.590 | | 0.520 | | 0.490 | |
| Porosity (cm$^3$/g) | 0.09 | | 0.21 | | 0.27 | |
| BET suface (m$^2$/g) | 0.1 | | 0.8 | | 1.1 | |

These three types of polyvinyl chloride were chlorinated according to the process of the invention, in which they were first kept for one hour in a chlorine atmosphere at the ambient temperature and were then subsequently chlorinated at 125° C during periods which varied from 20 minutes to four hours. The results are shown in Table 2. The reaction times are total times, i.e., they include the stabilization of 60 minutes.

Table 2

| Varlan 5900 | | Varlan 6600 | | Varlan 7100 | |
|---|---|---|---|---|---|
| Reaction time min. | % by w. Cl | Reaction time min. | % by w. Cl | Reaction time min. | % by w. Cl |
| 0 | 56.8 | 0 | 56.8 | 0 | 56.8 |
| 60 | 57.1 | 60 | 57.1 | 60 | 58.0 |
| 80 | 59.6 | 80 | 61.8 | 80 | 63.0 |
| 90 | 61.3 | 90 | 63.7 | 90 | 64.8 |
| 100 | 62.9 | 100 | 65.1 | 100 | 66.2 |
| 120 | 65.0 | 120 | 66.8 | 120 | 67.5 |
| 180 | 66.9 | 150 | 68.4 | 150 | 69.2 |
| 240 | 67.4 | 180 | 68.7 | 180 | 70.1 |
| 300 | 67.8 | 240 | 69.6 | 300 | 72.0 |
|   |   | 300 | 70.2 |   |   |

EXAMPLE 2

In a similar way as in example 1 Varlan 6600 was chlorinated. The Vicat temperatures of the chlorinated products were measured. The results are given in table 3.

Table 3

| Reaction time min. | % by weight Cl | Vicat ° C |
|---|---|---|
| 0 | 56.8 | 85 |
| 60 | 57.4 | 87 |
| 80 | 62.7 | 107 |
| 100 | 64.6 | 114 |
| 120 | 66.4 | 124 |
| 150 | 67.6 | 135 |
| 180 | 67.8 | 134 |
| 240 | 69.0 | 146 |
| 300 | 70.0 | 151 |

EXAMPLE 3

For comparison with the products obtained in example 2, Varlan 6600 was then chlorinated according to a gel process. For this purpose a reactor provided with a stirrer was used, into which 500 g of Varlan 6600 and 3 litres (4.8 kg) of carbon tetrachloride were introduced. The suspension was stirred and at the ambient temperature, i.e., at about 25° C, 0.5% by weight of di-isopropylperoxydicarbonate based on the weight of the polyvinyl chloride was added. Next, while passing chlorine through the polyvinylchloridesuspension the temperature of the suspension was gradually raised to 50° C. The heating time amounted to about 15 minutes. The results are shown in table 4. The reaction times are inclusive of the heating time.

Table 4

| Reaction time min. | % by weight Cl | Vicat ° C |
|---|---|---|
| 45 | 58.9 | 89 |
| 60 | 62.0 | 101 |
| 75 | 64.9 | 119 |
| 105 | 68.3 | 143 |
| 120 | 69.2 | 148 |

The same series of tests was carried out with 0,5% by weight of azobisisobutyronitrile for radical-forming initiator, in which the temperature of the suspension was brought at 70° C. The results are shown in table 5.

Table 5

| Reaction Time min. | % by weight Cl | Vicat ° C |
|---|---|---|
| 45 | 65.0 | 119 |
| 60 | 66.8 | 138 |
| 90 | 70.5 | 149 |

EXAMPLE 4

For comparison a series of tests was conducted in the rotary drum according to the process described in the preceding examples, but this time the Varlan 6600 was not previously contacted with a chlorine atmosphere at the ambient temperature or a slightly elevated temperature but was heated directly to 75° C in about 10 minutes and 0.5% by weight of azobisisobutyronitrile, a radical-forming initiator referred to the polyvinyl chloride, was added.

The results are shown in Table 6.

Table 6

| Reaction time min | % by weight Cl | Vicat ° C |
|---|---|---|
| 60 | 62.0 | 92 |
| 90 | 62.8 | 99 |
| 180 | 64.5 | 104 |
| 300 | 66.2 | 100 |

The comparative tests show that in the case of chlorination in the gas phase with a radical initiator and without a previous stabilization period, chlorinated products are obtained whose Vicat temperature is distinctly lower than that of chlorinated products prepared according to a gel phase process or products chlorinated according to the present process, having a corresponding chlorine content.

EXAMPLE 5

Varlan 6600 was chlorinated at different temperatures according to the process of Example 1. The results are given in Table 7.

Table 7

| Reaction temp. 125° C | | Reaction temp. 100° C | | Reaction temp. 75° C | |
|---|---|---|---|---|---|
| Reaction time min. | % by w. Cl | Reaction time min. | % by w. Cl | Reaction time min. | % by weight Cl |
| 0 | 568 | 0 | 56.8 | 0 | 56.8 |
| 60 | 571 | 60 | 57.1 | 60 | 57.1 |
| 80 | 618 | 80 | 60.9 | 80 | 58.3 |
| 90 | 637 | 90 | 62.0 | 90 | 58.8 |
| 100 | 651 | 100 | 62.6 | 100 | 59.8 |
| 120 | 668 | 120 | 64.5 | 120 | 60.4 |
| 150 | 684 | 150 | 66.0 | 150 | 61.8 |
| 180 | 687 | 180 | 66.4 | 180 | 62.8 |
| 240 | 697 | 240 | 67.4 | 240 | 63.8 |
| 300 | 702 | 300 | 68.2 | 300 | 65.0 |

EXAMPLE 6

The influence of the chlorine concentration on the chlorination speed was determined in a series of tests. In a manner analogous to that described in Example 1, the chlorination was effected with a chlorine flow, under atmospheric pressure at about 22° C, amounting to $44.25 \times 10^{-5}$ kg of Cl per sec. per kg of polyvinyl chloride introduced into the reactor. To obtain different chlorine concentrations this constant chlorine flow was mixed with a nitrogen flow. The nitrogen flow was so chosen that a chlorine concentration of 66 vol.-% of chlorine, respectively a chlorine concentration of 34 vol.-% of chlorine was obtained. The results of these atmospheric-pressure tests, in which the chlorination was carried out at 125° C, are given in Table 8.

Table 8

| $C_{Cl_2}$ = 100 vol.−% of $Cl_2$ | | $C_{Cl_2}$ = 66 vol.−% of $Cl_2$ | | $C_{Cl_2}$ = 34 vol.−% of $Cl_2$ | |
|---|---|---|---|---|---|
| reaction time min. | % by w. of Cl | reaction time min. | % by w. of Cl | reaction time min. | % by weight of Cl |
| 0 | 56.8 | 0 | 56.8 | 0 | 56.8 |
| 60 | 57.1 | 60 | 57.1 | 60 | 57.1 |
| 80 | 61.8 | 80 | 60.5 | 80 | 59.6 |
| 90 | 63.7 | 90 | 61.4 | 90 | 60.0 |
| 100 | 65.1 | 100 | 63.0 | 100 | 60.9 |
| 120 | 66.8 | 120 | 64.6 | 120 | 62.5 |

Although the absolute amount of chlorine passed through the reaction mixture was identical in all cases, it appears that dilution with an inert gas causes the chlorination to proceed more slowly. It can be calculated that $\log K_{125} \cdot C = n \log C_{Cl_2} + C$; $n$ appeared to be equal in this case to 0.74.

EXAMPLE 7

The minimum time during which the polymer is to be contacted with chlorine in the first step can be easily determined on the basis of a few experiments, illustrated as follows:

In the case of Varlan 6600 this time was determined for stabilization under atmospheric pressure at 25° C. Varlan 6600 was contacted at 25° C, according to the process described above, with chlorine under atmospheric pressure in a rotary drum and, following periods of time varying from 0 minutes to 120 minutes, heated to 130° C and chlorinated at that temperature for 2 hours. The 0 minutes of the first test indicates that at the moment chlorine was commenced to be passed through the polymer the heating to 130° C was also started. The results are given in Table 9.

Table 9

| Stabilizaton period at 25° C (min) | Reaction time at 130° C (min) | Appearance of end-product | % by weight of Cl. |
|---|---|---|---|
| 0 | 120 | serious to | |
| 15 | 120 | less serious | |
| 30 | 120 | discolouration | |
| 45 | 120 | fine, white powder | 69.7 |
| 60 | 120 | fine, white powder | 69.6 |
| 120 | 120 | fine, white powder | 69.7 |

The table shows that in the case of Varlan 6600, under the reaction conditions here described, a period of 45 minutes during the first step is sufficient.

What is claimed is:

1. A process for the dry chlorination of powdery vinyl chloride polymers with gaseous chlorine comprising the steps:
   1. introducing chlorine into a reaction vessel containing the vinyl chloride polymer powder and maintaining the polymer in a chlorine atmosphere in the absence of radical-forming initiators, radical-forming initiating radiation or both at temperatures of at most about 50° C. for at least 30 minutes;
   2. raising the temperature of the reaction to a temperature of at least 70° C., but below the agglomeration temperature of the vinyl chloride polymer, such that thermal radical-formation occurs and chlorination of the vinyl chloride polymer occurs to the required chlorine content thereby producing chlorinated vinyl chloride polymer powder;

the relationship between the time required for the two steps is such that the reaction time of the first step is selected to be such that, in the second step, in the temperature range at which thermal radical-formation occurs, no thermal degradation and subsequent product discoloration occurs thereby producing a chlorinated vinyl chloride polymer powder having a chlorine content in excess of the starting vinyl chloride polymer.

2. A process for the dry chlorination of powdery vinyl chloride polymers with gaseous chlorine including the steps of (1) reacting vinyl chloride polymer powder with chlorine in the absence of radical-forming initiators, radical-forming initiating radiation or the like, the powdery vinyl chloride polymer maintained in a chlorine atmosphere for at least 30 minutes to temperatures being at most slightly above ambient temperature of at most about 50° C thereafter (2) raising the temperature of the reaction to a temperature of at least 70° C, but below the agglomeration temperature of the vinyl chloride polymer, such that thermal radical-formation occurs and chlorination takes place to the requied chlorine content thereby producing chlorinated vinyl chloride polymer powder.

3. The process according to the claim 1 wherein the treatment with chlorine in the first step is carried out at a temperature of at least about −20° C.

4. The process according to claim 1 wherein the treatment with chlorine in the first step is carried out at a temperature of at least 0° C.

5. The process according to claim 3 wherein the treatment with chlorine in the first step is carried out at a temperature of at most about 35° C.

6. The process according to claim 1 wherein the treatment with chlorine in the first step is commenced at a temperature in the range of 20°-25° C.

7. The process according to claim 1 wherein in the first step, the vinyl chloride polymer is maintained in contact with chlorine for a period of at least 30 minutes.

8. The process according to claim 1 wherein in the first step the vinyl chloride polymer is kept in contact with chlorine for a period of at least 45 minutes.

9. The process according to claim 1 wherein the chlorination in the second step is carried out at a temperature of at least 100° C.

10. The process according to claim 1 wherein the chlorination in the second step is carried out at a temperature of at most 140° C.

11. The process according to claim 1 wherein the chlorination in the second step is carried out at temperatures of 110°-130° C.

12. The process according to claim 1 wherein the process is conducted at a pressure of at least 0.8 kg/cm².

13. The process according to claim 1 wherein the first step is conducted at a chlorine pressure of 0.8 − 8 kg/cm².

14. The process according to claim 1 wherein the second step is conducted at a pressure of 0.8 – 10 kg/cm².

15. The process according to claim 1 wherein a chlorine-containing atmosphere containing 30–100% by volume of chlorine is used.

16. The process according to claim 1 wherein the starting vinyl chlorine polymer has a K value of 45 to 80.

17. Process according to claim 1 wherein the vinyl chloride polymer is a homopolymer or copolymer containing up to 20 mol percent of another copolymerizable monomer.

18. Chlorinated vinyl chloride polymer powder having a chlorine content of between about 65–70% by weight produced according to the process of claim 1.

* * * * *